United States Patent [19]
Tsuchiya et al.

[11] Patent Number: 5,224,747
[45] Date of Patent: Jul. 6, 1993

[54] CHUCK DEVICE WITH MULTISTAGE DEGREE OF OPENING

[75] Inventors: Tatsuo Tsuchiya; Kenichi Sueyoshi, both of Asahi, Japan

[73] Assignee: Kuroda Precision Industries Ltd., Kanagawa, Japan

[21] Appl. No.: 738,519

[22] Filed: Jul. 31, 1991

[30] Foreign Application Priority Data

Jul. 31, 1990 [JP] Japan .................. 2-80621[U]

[51] Int. Cl.⁵ .............................................. B25J 15/00
[52] U.S. Cl. ................................. 294/119.1; 901/38; 279/110
[58] Field of Search ............. 294/119.1; 901/31, 36, 901/38; 279/110, 114, 118

[56] References Cited

U.S. PATENT DOCUMENTS

| | | | |
|---|---|---|---|
| 1,813,705 | 7/1931 | Lewis | 279/118 |
| 3,123,371 | 3/1964 | Marsden | 279/110 |
| 3,679,221 | 7/1972 | Behrens | 279/110 X |
| 4,529,237 | 7/1985 | Gupta et al. | 294/119.1 X |
| 4,696,503 | 9/1987 | Collodel | 294/119.1 X |
| 4,762,357 | 8/1988 | Bergamo | 901/36 X |
| 4,768,821 | 9/1988 | Hucul et al. | 294/119.1 |
| 4,955,653 | 9/1990 | Beals | 901/38 X |

FOREIGN PATENT DOCUMENTS

| | | |
|---|---|---|
| 60-52282 | 3/1985 | Japan . |
| 63-91707 | 6/1988 | Japan . |
| 1333573 | 8/1987 | U.S.S.R. ............... 294/119.1 |

*Primary Examiner*—Russell D. Stormer
*Assistant Examiner*—Dean J. Kramer
*Attorney, Agent, or Firm*—Keck, Mahin & Cate

[57] ABSTRACT

This invention relates to a chuck device with multistage degree of opening composed of an oscillating actuator acting as a driving part and an arm opening or closing mechanism installed at one end part to which an output shaft of the oscillating actuator is projected, the actuator having a plurality of oscillating vanes concentrically arranged within casings, the casing for an inner oscillating vane structure being rotatably supported in respect to the casing for an outer oscillating vane structure so as to form a rotary shaft and at the same time an oscillating vane of the outer oscillating structure is fixed to the rotary shaft. The output shaft is connected to the oscillating vane of the inner-most oscillating vane structure so as to enable its intermediate stopping to be attained, the arm opening or closing mechanism being comprised of a pair of guide rail blocks oppositely arranged in a spaced-apart relation at both sides of the output shaft while being crossed at a right angle with an extending direction of the output shaft and fixed to the end of the outer-most casing of the oscillating actuator.

2 Claims, 8 Drawing Sheets

PRIOR ART

CHUCK DEVICE WITH MULTISTAGE DEGREE OF OPENING

BACKGROUND OF THE INVENTION

1. Field of the Invention

This invention relates to a chuck device, for example, a chuck device which is fixed to an extreme end of an arm of an industrial robot, holds a workpiece and be applied for its transportation or assembly or the like.

2. Description of the Prior Art

As a prior art chuck device, as shown in Jap.Pat.-Laid-Open No.Sho 60-52282, a rack is connected to a rod of a driving source such as a reciprocating cylinder or the like and further a pair of pinions are engaged with the rack and then each of holding claws can be opened or closed to their maximum degrees of opening by arms extending from the pinions.

Figure 10:
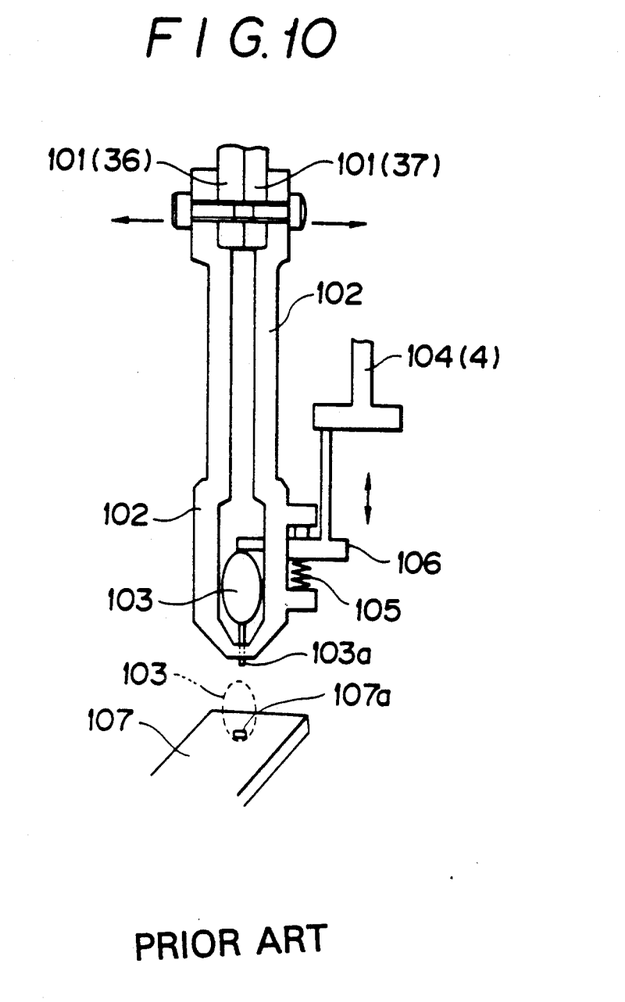
FIG. 10 shows a state of use of the device shown in FIG. 1.

However, this type of chuck device is used, for example, as shown in FIG. 10, in an automatic parts feeding operation in such a way as each of holding claws 102 and 102 is fixed to a pair of right and left arms 101 and 101 driven to be opened or closed, a workpiece 103 such as an electronic parts or the like is held and at the same time a cylinder 104 fixed to the chuck device similarly depresses the workpiece 103 through a pushing rod 106 resiliently supported by a spring 105, a leg part 103a of the parts is inserted into a fixing hole 107a of a printed circuit board 107, thereafter each of the arms 101 and 101 as well as the holding claws 102 and 102 is widely opened and then an entire chuck device is pulled up.

In this case, before holding the workpiece 103, it is preferable to have the maximum degree of opening of the chuck as much as possible so as to enable the positive holding of the workpiece to be carried out even if the position where the workpiece 103 is mounted is slightly displaced. In addition, it is also preferable that when the chuck is to be released from the workpiece 103, a degree of opening of the chuck is made as less as possible in so as to prevent other adjoining electronic parts already inserted into the printed circuit board 107 from being deformed or damaged.

However, in case of the prior art chuck device described above, since the chuck is opened to its maximum degree of opening even in case of releasing the workpiece, the prior art chuck device may not be adapted for a printed circuit board having several electronic parts closely gathered to each other on it due to the aforesaid reasons. If a surplus space is provided in case of using this type of chuck irrespective of this size, a printed circuit board design becomes out of its normal standard one to cause a troublesome operation and further it may generate some problems such as an increased size of the printed circuit board or a large-sized entire device having the printed circuit board assembled therein.

In turn, if the degree of opening is low, it is not possible to hold a large-sized workpiece and if the degree of opening is too much, an operation to hold or release a small workpiece may generate an useless state to cause a working efficiency to be decreased.

In view of the above, the present invention may resolve these problems and it is an object of the present invention to provide a chuck device which can be used even at an intermediate degree of opening in addition to its maximum degree of opening.

SUMMARY OF THE INVENTION

The first gist of the present invention consists in a chuck device with multistage degree of opening composed of an oscillating actuator acting as a driving segment and an arm opening or closing mechanism installed at one end from which an output shaft of the oscillating actuator is projected, wherein the oscillating actuator has a plurality of oscillating vane structures concentrically arranged within the casings, one casing for the inner oscillating vane structure is rotatably supported in respect to the other casing for the outer oscillating vane structure so as to form a rotary shaft, the oscillating vane of the outer oscillating vane structure is fixed to the rotary shaft, the output shaft is connected to the oscillating vane of the inner-most oscillating vane structure to enable its intermediate stopping to be attained, the aforesaid arm opening or closing mechanism is comprised of a pair of guide rail blocks oppositely arranged in a spaced-apart relation at both sides of the output shaft while being crossed at a right angle in an extending direction of the output shaft and fixed to the end segments of the outer-most casing of the oscillating actuator; a pair of slide shafts having each of the arms for holding a workpiece at their extreme ends and slidable along the guide rail blocks; and link mechanisms, one of which is fixed to the output shaft of the aforesaid oscillating actuator and the other of which is fixed to each of the aforesaid slide shafts, converts a swinging rotary movement of the output shaft into a linear reciprocating movement and transmits it to each of the slide shafts.

The second gist of the present invention consists in a chuck device with multistage degree of opening in which each of the output shaft and the rotary shaft is projected at the other end of the aforesaid oscillating actuator and there is provided an adjustable angle adjusting mechanism engaged with each of the output shaft and the rotary shaft so as to regulate a swinging angle of the oscillating shaft.

DESCRIPTION OF THE PREFERRED EMBODIMENT

Referring now to the drawings, one preferred embodiment of the present invention will be described in detail.

Figure 1:
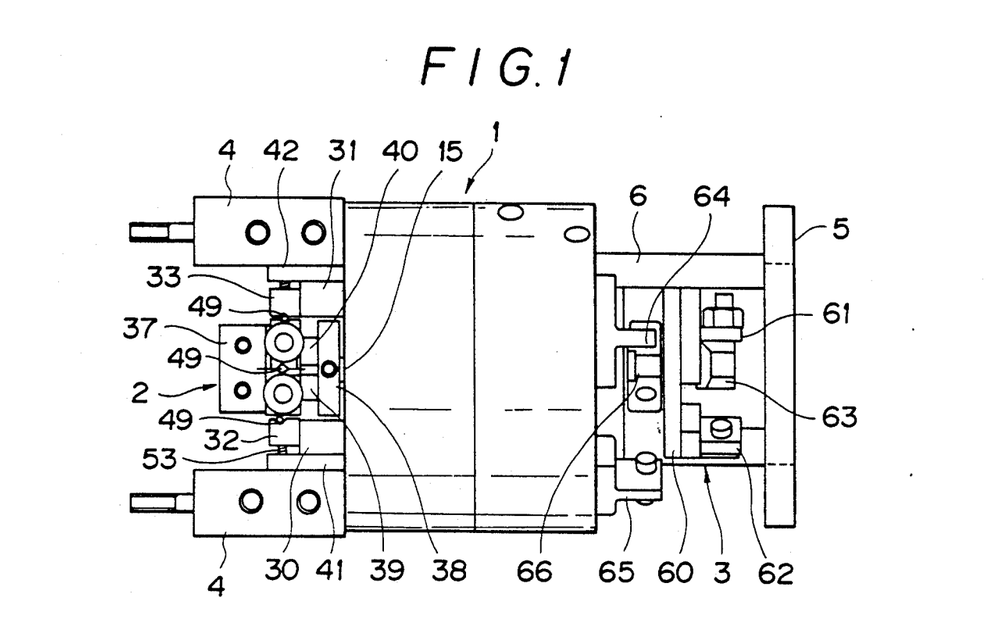
FIG. 1 is an entire top plan view for showing a chuck device of one preferred embodiment of the present invention.
Figure 2:
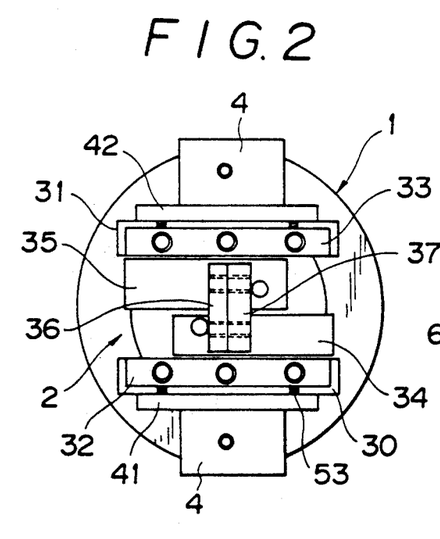
FIG. 2 is a front elevational view for showing the device shown in FIG. 1.
Figure 3:
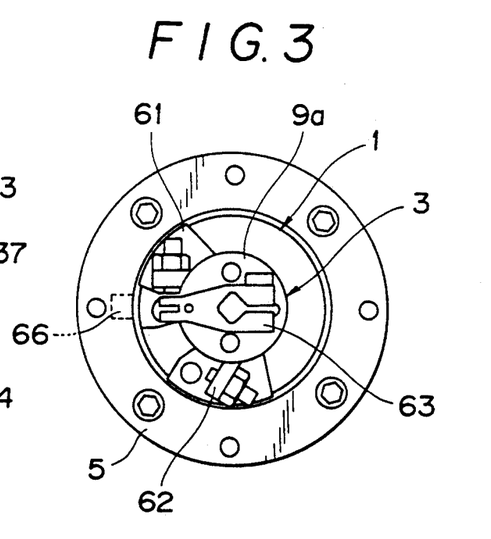
FIG. 3 is a rear view for showing the device shown in FIG. 1.

FIG. 1 is a top plan view for showing a chuck device of one preferred embodiment of the present invention, FIG. 2 is a front elevational view of the device and FIG. 3 is a rear view of the device, respectively. This chuck device is roughly composed of an oscillating actuator 1 forming a driving part oscillatably rotated under a state of which intermediate stopping can be attained by the output shaft and the rotary shaft cooperatively connected to each of the oscillating vanes concentrically arranged at inside and outside, respectively; an arm opening or closing mechanism 2 arranged at one end of the oscillating actuator 1 so as to convert the swinging rotary movements of the output shaft and the rotary shaft into a linear reciprocating movement and opening or closing the arms to which the holding claws are fixed; and an angular adjusting mechanism 3 arranged at the other end of the oscillating actuator 1 so as to restrict a swinging range of the output shaft and the rotary shaft.

To one end of the oscillating actuator 1 are fixed cylinders 4 and 4 corresponding to the cylinder 104 for pushing down the workpiece 103, and further to the other end of the oscillating actuator 1 is fixed through connector rods 6 a fixing flange 5 for use in fixing the chuck device to an arm part of a working robot.

Since the aforesaid oscillating actuator 1 is similarly constructed as that disclosed in Jap.U.M.Laid-Open No.Sho 63-91707 previously proposed by the applicant, its detailed description will be eliminated and only its major configuration will be described.

Figure 4:
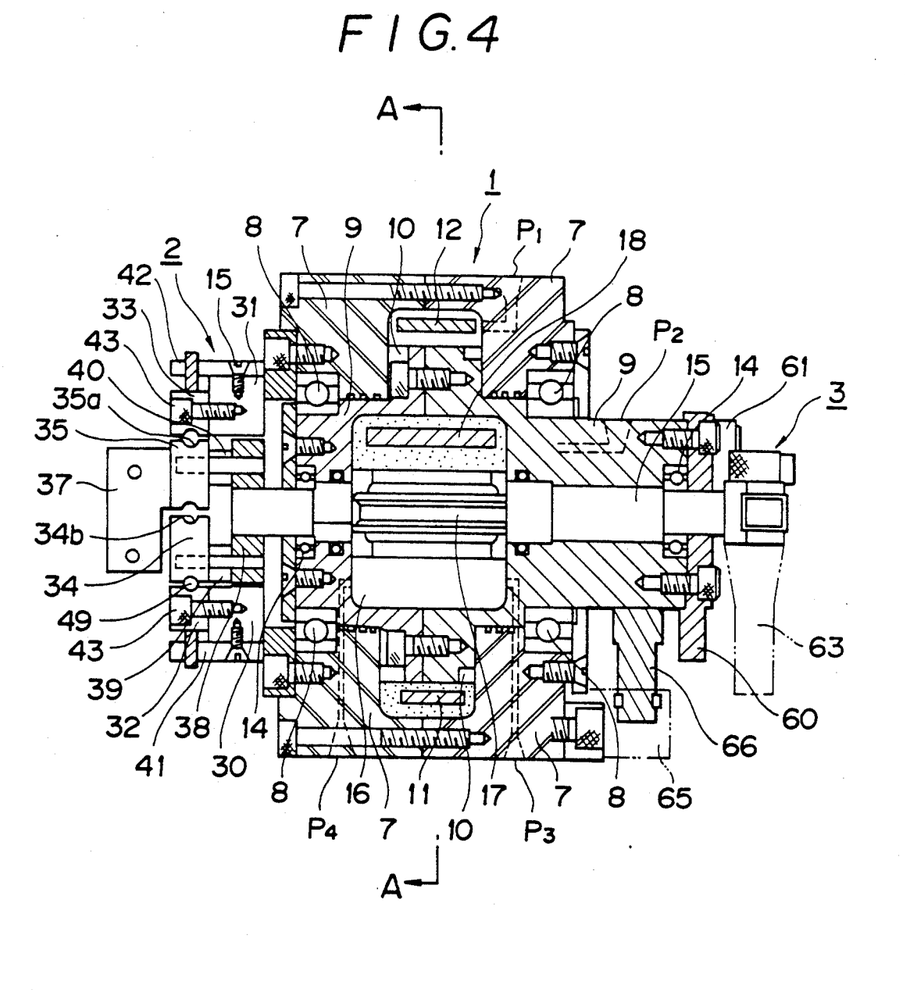
FIG. 4 is a longitudinal section for showing the device shown in FIG. 1.
Figure 5:
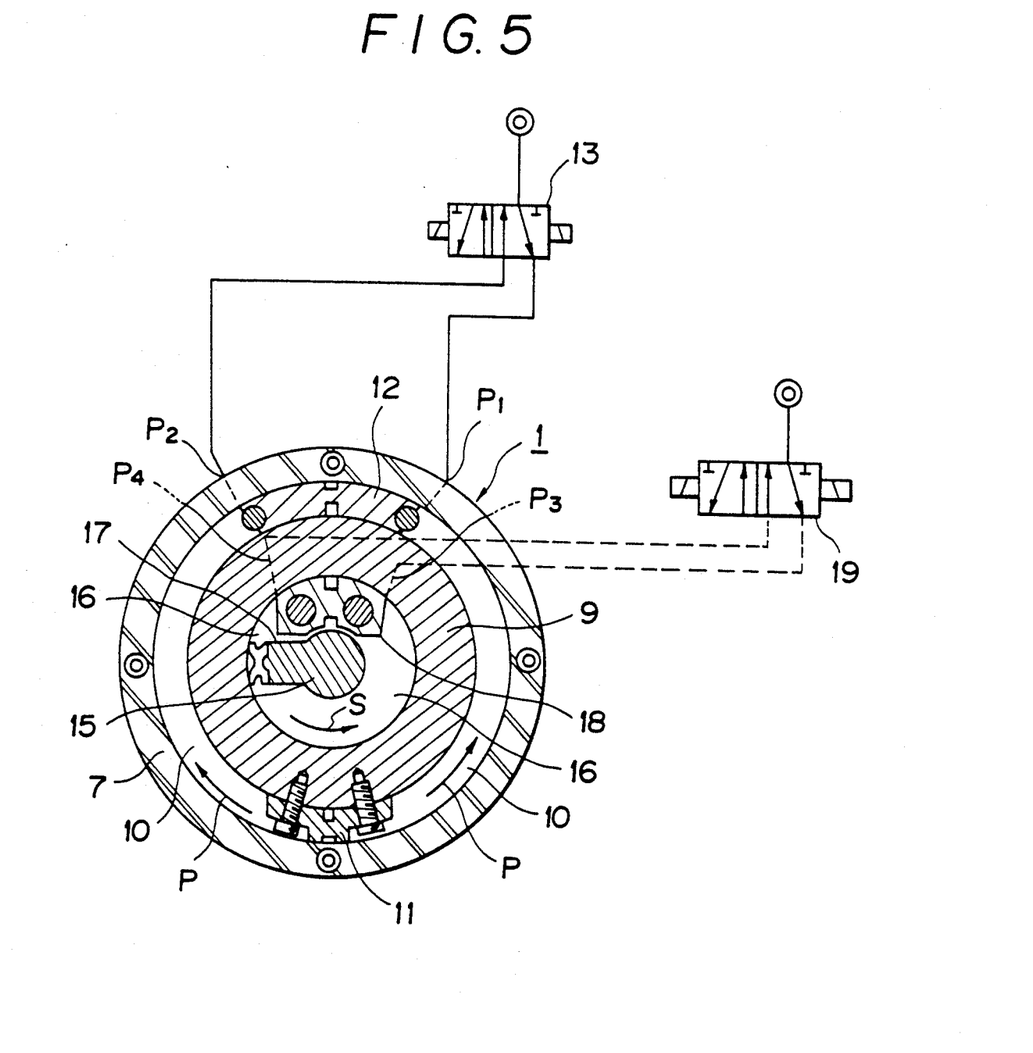
FIG. 5 is a sectional view taken along a line A—A of FIG. 4.

The oscillating actuator 1 is constructed as shown in a longitudinal section of FIG. 4 and in FIG. 5 showing a section taken along a line A—A in FIG. 4. Inner circumferential segments of both front and rear ends of a casings 7 are provided with each of bearings 8 and 8. A cylindrical rotary shaft 9 is rotatably supported at the inner circumferential segments through bearings 8. The casings 7 are recessed in annular forms at their central inner peripheral segments and an outer vane compartment 10 is formed between the casing and the outer periphery of the rotary shaft 9.

To this rotary shaft 9 is integrally fixed an outer oscillating vane 11 projected into the aforesaid outer vane compartment 10 and having its extreme end slidably contacting with the inner circumferential surfaces of the casings 7. To the inner circumferential segments of the casings 7 is fixed a fixing shoe 12 acting as a stopper for the oscillating vane 11. Within each of the two outer vane compartments 10 defined by the outer oscillating vane 11 and the fixed shoe 12 is supplied a fluid pressure through ports P1 and P2. The rotary shaft 9 is swung and rotated in a clockwise or counter-clockwise direction as shown by an arrow P together with the outer oscillating vane 11 under a control of a change-over valve 13.

At the inner circumferential segments of both forward and rearward ends of the rotary shaft 9 are arranged each of the bearings 14 and 14, and the output shaft 15 is rotatably supported while passing through an axis of it through bearings 14. The central inner circumferential segment of the rotary shaft 9 through which the output shaft 15 passes is recessed in an annular form so as to form an inner vane compartment 16 between it and the outer circumference of the output shaft 15.

To this output shaft 15 is integrally fixed an inner oscillating vane 17 which is projected into the inner vane compartment 16 and of which extreme end is slidably contacted with an inner circumferential surface of the rotary shaft 9. To the inner circumference of the rotary shaft 9 is fixed a fixing shoe 18 acting as a stopper for the oscillating vane 17. Fluid pressure is supplied through ports P3 and P4 into each of the two inner vane compartments 16 defined by the inner oscillating vane 17 and the fixing shoe 18. The output shaft 15 is swung and rotated in a clockwise or a counter-clockwise direction as shown by an arrow S together with the inner oscillating vane 17 under a control of the changing-over valve 19.

At the oscillating actuator 1, when the inner oscillating vane 17 is rotated at first to its maximum swinging angle $\phi 1$, the output shaft 15 is intermediately stopped at the position of the maximum swinging angle $\phi 1$ and then when the outer oscillating vane 11 is rotated up to the maximum swinging angle $\phi 2$, the inner oscillating vane 17 having the rotary shaft 9 causes the output shaft 15 to be rotated up to the position of the maximum swinging angle $\phi 2$ while being cooperatively operated at its intermediate stopping position. Accordingly, the output shaft 15 is rotated up to the angles $\phi 1 + \phi 2$ in respect to its starting point position.

Figure 6:
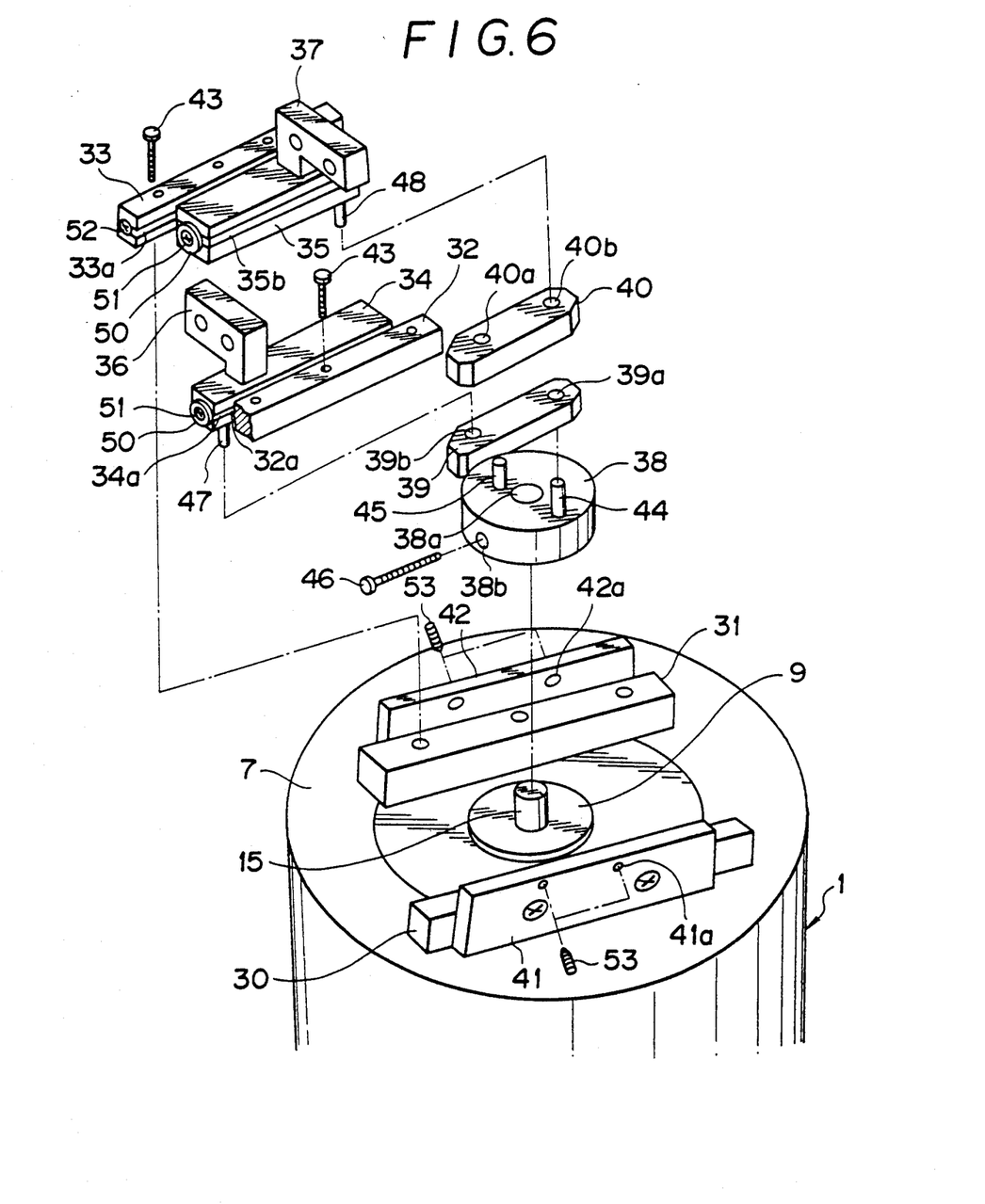
FIG. 6 is an exploded perspective view for showing an arm opening or closing mechanism in the device shown in FIG. 1.

Then, a configuration of the arm opening or closing mechanism 2 will be described in reference to the aforesaid FIGS. 1 to 4 in addition to FIG. 6.

The arm opening or closing mechanism 2 is composed of as its major components base blocks 30, 31; guide rail blocks 32 and 33; sliding shafts 34 and 35; arms 36 and 37; a cam plate 38, connector rods 39 and 40; and adjusting plates 41 and 42.

Each of the base blocks 30 and 31 is formed of a rectangular parallelpiped, arranged at opposing locations around the output shaft 15 projected from the oscillating actuator 1 and then fixed to the casing 7 at the end surface of the rotary shaft 9.

The guide rail blocks 32 and 33 are of a rectangular parallelpiped in which each of the V-shaped guide grooves 32a and 33a is formed at the longitudinal inner surfaces. Each of the guide rail blocks is mounted on each of the base blocks 30 and 31 while each of the guide grooves 32a and 33a are inwardly oppositely in parallel to each other, and further each of them is fixed to the base blocks 30 and 31 by screws 43.

The cam plate 38 is of a disk having an axial hole 38a formed at its central part and a pair of pins 44 and 45 projected from the opposing positions of the axial hole 38a upwardly are fixed and mounted. A projecting end of the output shaft 15 is inserted into the axial hole 38a and fixed to the output shaft 15 through a screw 46 threadably engaged with a threaded hole 38b crossing at a right angle with the axial hole 38a.

The sliding shafts 34 and 35 are formed as a rectangular parallelpiped in which their longitudinal both side surfaces are formed with each of V-shaped guide grooves 34a and 34b and guide grooves 35a and 35b, respectively. From each of the upper surfaces of the sliding shafts is projected each of the arms 36 and 37 extending at a right angle with a longitudinal direction and inwardly and further from a lower surface of each of the sliding shafts is projected each of the pins 47 and 48, respectively. The sliding shafts 34 and 35 cause the guide groove 34a to be faced against the guide groove 32a of the guide rail block 32, the guide groove 34b to be faced against the guide groove 35b of the sliding shaft 35, and the guide groove 35a to be facted against the guide groove 33a of the guide rail block 33, respectively. A part of the arm 36 at the sliding shaft 34 is projected at the upper surface of the sliding shaft 35, a part of the arm 37 at the sliding shaft 35 is projected at the upper surface of the sliding shaft 34 and they are arranged in side-by-side relation between each of the guide rail blocks 32 and 33. Rollers 49 are placed between these opposing guide grooves while the rollers being stored in the guide grooves, and they are engaged such that the sliding shafts 34 and 35 can be slidably moved along each of the guide rail blocks 32 and 33.

Reference numerals 50 and 51 denote washers and screws fixed to the end segments of the sliding shafts in order to prevent the rollers 49 from being pulled out of the guide grooves of the sliding shafts. Reference numeral 52 denotes screws fixed to the ends of the sliding shafts in order to prevent the rollers 49 from being pulled out of the guide grooves of the guide rail blocks.

The connecting rods 39 and 40 are of a rectangular parellelpiped having fitting holes 39a and 39b and fitting holes 40a and 40b punched therein, wherein a pin 44 of the cam plate 38 is pivoted to the fitting hole 39a, and a pin 45 of the cam plate 38 is pivoted to the fitting hole 40a, respectively and a pin 47 of the sliding shaft 34 is pivoted to the fitting hole 39b, and a pin 48 of the sliding shaft 35 is pivoted to the fitting hole 40b, and then the cam plate 38 and each of the sliding shafts 34 and 35 is link connected through the connector rods 39 and 40.

The adjusting plates 41 and 42 have threaded holes 41a and 42a at their upper segments to which adjusting screws 53 are threadably engaged and their lower segments are set with screws to the outer surfaces of the base blocks 30 and 31. In this case, a clearance is formed between the upper inner surfaces of the adjusting plates 41 and 42 and the outer surfaces of the guide rail blocks 32 and 33. The outer surfaces of the guide rails blocks 32 and 33 are pushed by the adjusting screws 53 threadably engaged with the threaded holes 41a and 42a, thereby a parallel degree of the sliding shafts 34 and 35 as well as their pushing forces is adjusted. The adjusting plates 41 and 42 may also act as the fixing plates for the cylinders 4.

Figure 7:
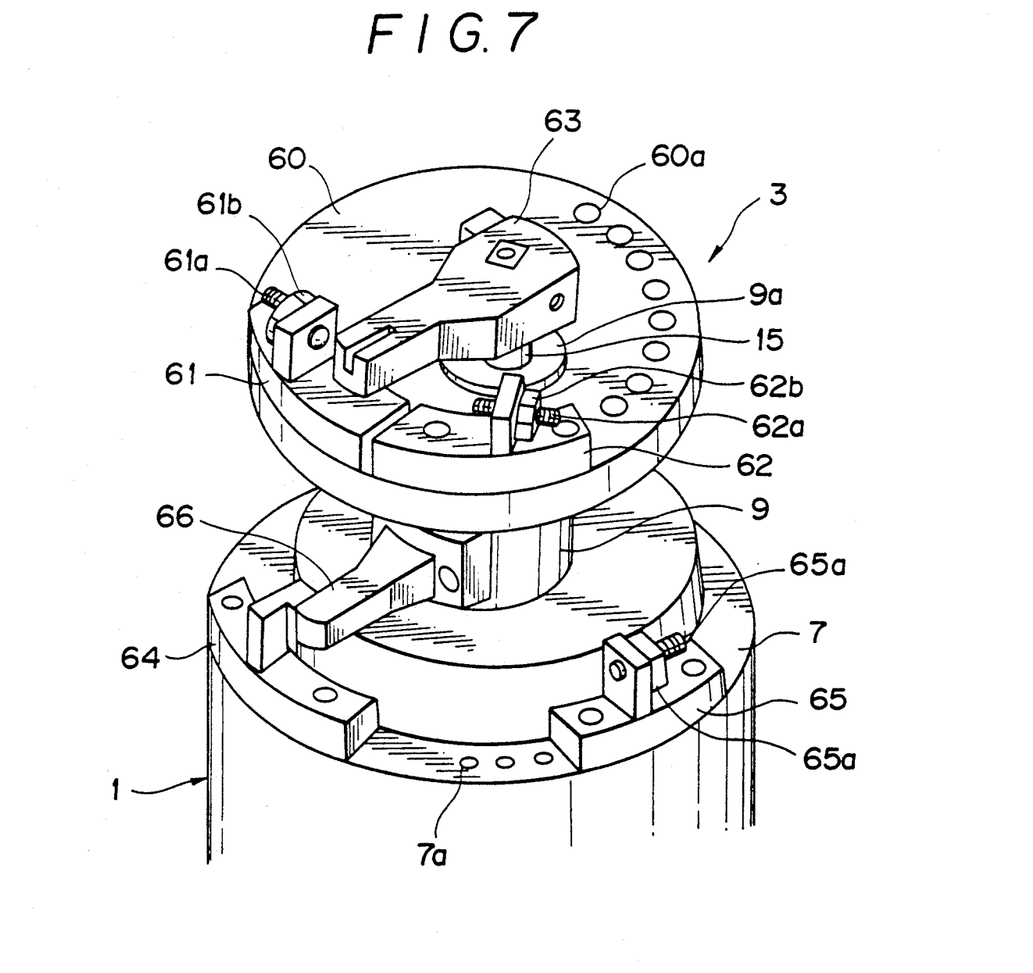
FIG. 7 is a perspective view for showing an angle adjusting mechanism in the device shown in FIG. 1.

Then, a configuration of the angle adjusting mechanism 3 will be described in reference to FIGS. 1 to 4 in addition to FIG. 7.

This angle adjusting mechanism 3 is composed of the first angle adjusting segment for restricting an oscillating vane 17 inside the oscillating actuator 1 and restricting an opening or closing angle of the output shaft 15 cooperating with the oscillating vane, and the second angle adjusting segment for restricting an opening or closing angle of the outer oscillating vane 11 and its cooperating rotary shaft 9.

The first angle adjusting segment is composed of a rotary disk 60 in which the output shaft 15 is rotatably inserted into an axis, several tap holes 60a are formed in its circumferential direction and fixed to the rotary shaft 9; each of a pair of stoppers 61 and 62 fixed to a predetermined angular position on the rotary disk 60 through any of the tap holes 60a; and a first operating lever 63 fixed to an end part of the output shaft 15 and extending axially in a radial direction.

To the end part of the rotary shaft 9 is integrally fixed a lid 9a in such a way as it may be rotated in respect to the rotary disk 60 and at the same time each of the stoppers 61 and 62 is provided with fine adjusting screws 61a and 62a and set screws 61b and 62b.

The second angular adjusting segment is composed of each of a pair of stoppers 64 and 65 fixed at a predetermined angular position through any of several tap holes 7a formed along a circumferential direction in respect to a side plate of the casing 7 of the oscillating actuator 1; and a second operating lever 66 fixed to the rotary shaft 9 and extending toward an axial radial direction. The stopper 65 is provided with each of a fine adjusting screw 65a and a set screw 65b, respectively.

Operation of the chuck device constructed as above will be described in reference to an operation of the angular adjusting mechanism 3 shown in FIG. 8 and another operation of the arm opening or closing mechanism 2 shown in FIG. 9. In this example, it is assumed that a maximum swinging angle of the inner oscillating vane 17 driving the output shaft 15 is at least more than 30+, for example, and a maximum oscillating angle of the outer oscillating vane 11 driving the rotary shaft 9 can be at least more than 60°, for example and thus an swinging angle of the output shaft 15 is regulated from 0° to 30° by the first angular adjusting segment of the angular adjusting mechanism 3 and at the same time the swinging angle of the rotary shaft 9 is regulated from 0° to 60° by the second angular adjusting segment of the angular adjusting mechanism 3. This case will be described.

Figure 8A:
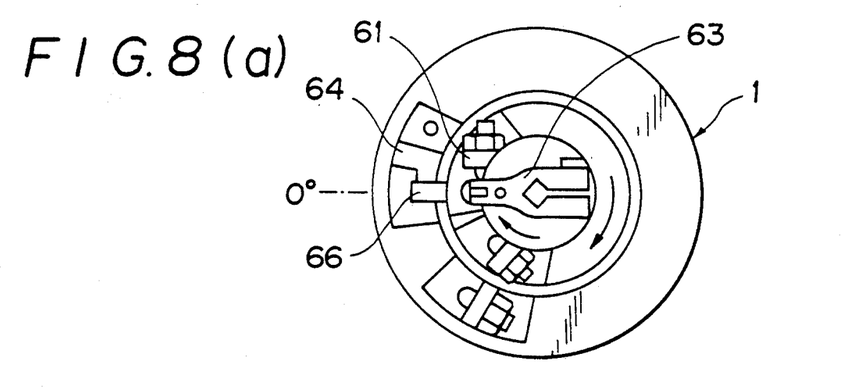
FIGS. 8(a)-8(c) are an operative illustration for showing an arm opening or closing mechanism in the device showing in FIG. 1.

At first, as each of the inner oscillating vane 17 of the oscillating actuator 1 and the outer oscillating vane 11 of the oscillating actuator 1 is operated toward a swinging start point and the output shaft 15 and the rotary shaft 9 are rotated in a clockwise direction as viewed in the drawing, the first operating lever 63 connected to the output shaft 15 at the first angular adjusting segment is engaged with the stopper 61 as shown in FIG. 8(a) and at the second angular adjusting segment, the swinging angle in which the second operating lever 66 connected to the second angular adjusting segment is engaged with the stopper 64 becomes zero.

At this time, at the arm opening or closing mechanism 2, the cam plate 38 connected to the output shaft 15 and each of the pins 44 and 45 projected at the cam plate 38 may receive a rotational force in a counter-clockwise direction as viewed in the drawing. However, since the connecting rod 39 of which one end is pivoted to the pin 44 and the other end is projected at the sliding shaft 34 and a connecting rod 40 of which one end is pivoted to the pin 45 and the other end of which is pivoted to the pin 48 projected the sliding shaft 35 are moved inwardly in parallel to each other in a direction crossing at a right angle with its axis since the movement of each of the sliding shafts 34 and 35 in their short directions is restricted by each of the guide rail blocks 32 and 33 and their rotational forces are converted into linear movement forces.

Figure 9A:
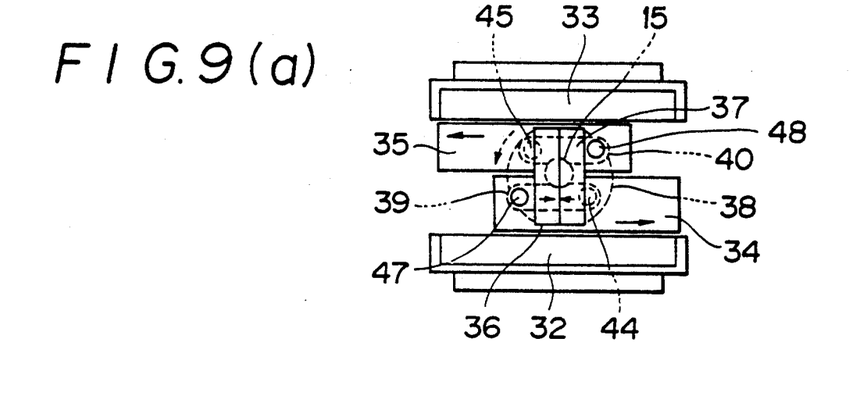
FIGS. 9(a)-9(c) are an operative illustration for showing an angle adjusting mechanism in the device shown in FIG. 1.

With such an arrangement, as shown in FIG. 9(a), each of the sliding shafts 34 and 35 is moved in parallel outwardly in a reverse direction while being slid along each of the guide rail blocks 32 and 33, and each of the arms 36 and 37 arranged at each of the sliding shafts 34 and 35 are moved inwardly in parallel to each other and they are fully closed.

Figure 8B:
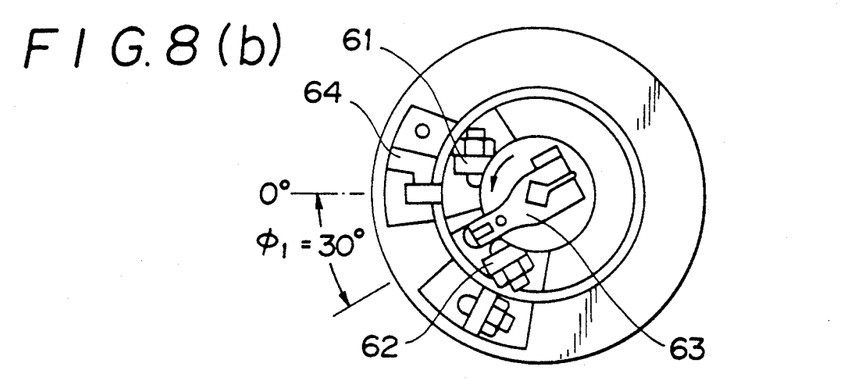

Then, only the inner oscillating vane 17 of the oscillating actuator 1 is operated to cause the output shaft 15 to be rotated in a counter-clockwise direction as viewed in the drawing, resulting in that as shown at FIG. 8(b), the first operating lever 63 connected to the output shaft 15 is engaged with the stopper 62 at the first angular adjusting segment and then the lever becomes an intermediate stopped state at a position having a swinging angle of 30°.

At this time, at the arm opening or closing mechanism 2, the cam plate 38 connected to the output shaft 15 receives a rotational force in a clockwise direction as viewed in the drawing. With such an arrangement, each of the sliding shafts 34 and 35 connected by a link through each of the connecting rods 39 and 40 is moved in parallel to each other inwardly in an opposite direction while being slid along each of the guide rail blocks 32 and 33 as shown in FIG. 9(b). Accordingly, each of the arms 36 and 37 arranged at each of the sliding shafts 34 and 35 is moved outwardly in parallel to each other and then each of the arms 36 and 37 can be expanded up to a position of a degree of opening (an intermediate degree of opening) which corresponds to a swinging angle of 30°.

Figure 9B:
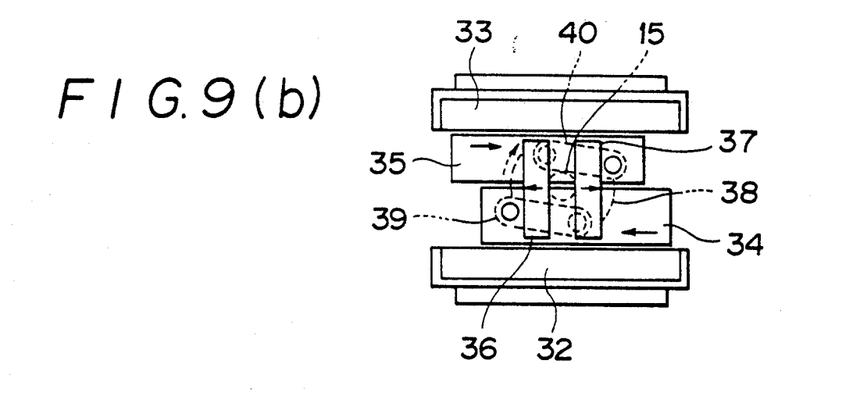

An operation opposite to the aforesaid operation enables the state to be changed from the intermediate degree of opening shown in FIG. 9(b) to a full closed state shown in FIG. 9(a), so that if each of the arms 36 and 37 is provided with a pair of holding claws 102 and 102 as shown in FIG. 10, a small workpiece can be positively and efficiently held and at the same time the workpiece can be held or released even at a narrow place without influencing its surrounding area.

Figure 8C:
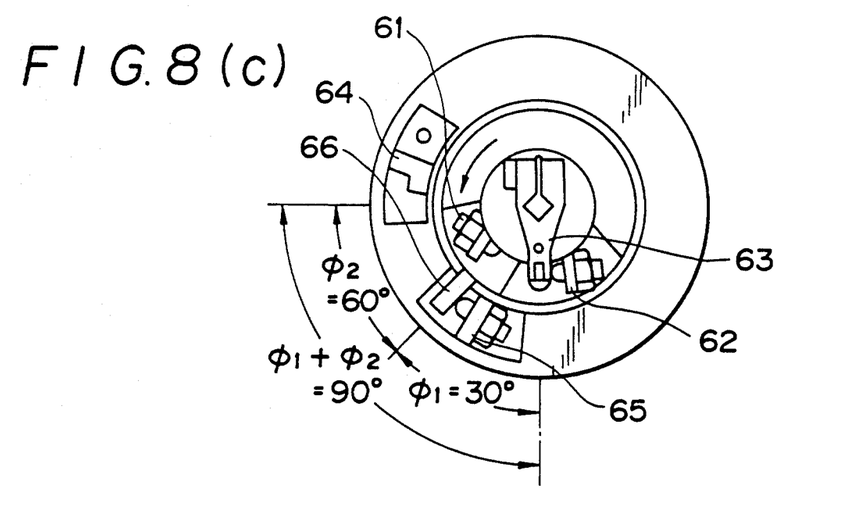

Then, when the outer oscillating vane 11 of the oscillating actuator 1 is operated under a state shown in FIG. 8(b) to rotate the rotary shaft 9 in a counter-clockwise direction as viewed in the drawing, the inner oscillating vane 17 having as its housing the rotary shaft 9 is also rotated together while the output shaft 15 is being set at its intermediate stopping position of the swinging angle of 30°, and it is rotated by a swinging angle of 60° as shown in FIG. 8(c) and then the operating lever 66 is stopped at a position where it is engaged with the stopper 65. Accordingly, the output shaft 15 is oscillated from the state shown in FIG. 8(a) by 90°.

Figure 9C:
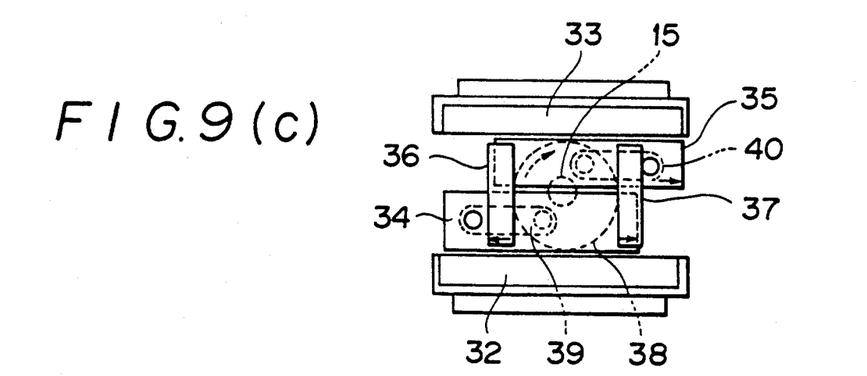

At this time, at the arm opening or closing mechanism 2, since the cam plate 38 connected to the output shaft 15 may receive a rotating force in a further clockwise direction as viewed in the drawing, so that each of the sliding shafts 34 and 35 is moved inwardly in parallel to each other in a reverse direction as shown in FIG. 9(c) and thus each of the arms 36 and 37 moved outwardly in parallel is enabled to be expanded up to a maximum degree of opening corresponding to a swinging angle of 90°.

Operation opposite to the aforesaid operation is carried out to get an intermediate degree of opening shown in FIG. 9(b) or after it is set to the intermediate degree of opening shown in FIG. 9(b) and subsequently the operation can be continued up to the full closed state shown in FIG. 9(a). Accordingly, if each of the arms 36 and 37 is provided with a pair of holding claws 102 and 102 as shown in FIG. 10, a large-sized workpiece or a workpiece of which mounting is slightly displaced may also be positively held or released.

In particular, in case that the device is used as shown in FIG. 10, a degree of opening is reduced from the maximum degree of opening and the holding claws 102 may positively hold the workpiece 103 and when the workpiece 103 is released, its intermediate degree of opening is opened up to its limited degree and thus the electronics parts around it can be prevented from being damaged.

Although the case in which the intermediate stopping at a position of 30° is described above, in case that only the outer oscillating vane 11 of the oscillating actuator 1 is operated at first from a state of 0°, the device can be set to the intermediate stopping condition even at the swinging angle of 60°, so that the arm opening or closing mechanism 2 can be expanded up to the second intermediate degree of opening position corresponding to 60° other than the first intermediate degree of opening position of aforesaid 30°. In this way, since the two intermediate degrees of opening can be attained, its wide application can be attained in correspondence with a state of use such as a simultaneous adaptation even for the two kinds of workpieces having different shapes and sizes.

The present invention is not limited to the aforesaid preferred embodiment, but various modifications can be attained within a scope of its gist.

For example, although the oscillating actuator acting as the driving part is made into a double oscillating vane in the preferred embodiment, and it is also possible to make a triple oscillating vane structure. In addition, although a disk-like cam plate is used as a link connecting member in the arm opening or closing mechanism and a rod-like cam plate may also be used.

The chuck device of the present invention is operated such that an arm can be expanded or retracted between the maximum degree of opening and the intermediate degree of opening or between the intermediate degree of opening and the full closed state or between the maximum degree of opening and the full-closed state, and they are properly selected to enable a multistage degree of opening to be applied.

Accordingly, for example, in case that a shape of the workpiece is large, it is used between the maximum degree of opening and the intermediate degree of opening and in turn if the shape of the workpiece is small, it can be used between the intermediate degree of opening and the full-closed state, so that the present invention may be adapted for a use at a location where various kinds of workpieces having different shapes or sizes as found in an assemblying line, and useless movement can be reduced and an efficient operation can be performed.

When the workpiece is to be held as found in case of an automatic inserting operation for an electronic parts for the aforesaid printed circuit board, the degree of opening is made large as much as possible and a positive holding of the workpiece can be attained irrespective of a mounting condition of the workpiece and at the same time when the workpiece is to be released, the degree of opening is made as less as possible so as not to provide any damage to its surrounding parts, the device is used at first between the maximum degree of opening and the full-closed state and then used between the intermediate degree of opening and the full-closed state, resulting in that it may easily be adapted and in addition the present invention may reduce some disadvantages of making a large-sized printed circuit board or a complicated design work for arranging the parts.

The foregoing description is an illustrative purpose only, and the present invention may provide various modifications and applications without departing from its spirit and the present invention is limited only by the description of the claims.

What is claimed is:

1. A chuck device with multistage degree of opening comprising an oscillating actuator acting as a driving part and an arm opening or closing mechanism installed at one end part to which an output shaft of the oscillating actuator is projected, said actuator having a plurality of oscillating vanes concentrically arranged within casings, a casing for an inner oscillating vane structure being rotatably supported with respect to a casing for an outer oscillating vane structure so as to form a rotary shaft, an oscillating vane of the outer oscillating structure being fixed to said rotary shaft, the output shaft being connected to the oscillating vane of the innermost oscillating vane structure to enable its intermediate stopping to be attained, said arm opening or closing mechanism being comprised of a pair of guide rail blocks oppositely arranged in a spaced-apart relation at both sides of said output shaft while being crossed at a right angle with an extending direction of the output shaft and fixed to the end of an outermost casing of the oscillating actuator; a pair of sliding shafts having arms for holding a workpiece at their extreme ends and slidable along the guide rail blocks; and link mechanisms, one end of which is fixed to the output shaft of said oscillating actuator and the other end of which is fixed to each of said sliding shafts to convert a swinging rotary movement of said output shaft into a linear reciprocating movement so as to transmit said rotary movement to each of the sliding shafts.

2. A chuck device with multistage degree of opening comprising an oscillating actuator acting as a driving part and an arm opening or closing mechanism installed at one end part to which an output shaft of the oscillating actuator is projected, said actuator having a plurality of oscillating vanes concentrically arranged within casings, a casing for an inner oscillating vane structure being rotatably supported with respect to a casing for an outer oscillating vane structure so as to form a rotary shaft, an oscillating vane of the outer oscillating structure being fixed to said rotary shaft, the output shaft being connected to the oscillating vane of the innermost oscillating vane structure to enable its intermediate stopping to be attained, said arm opening or closing mechanism being comprised of a pair of guide rail blocks oppositely arranged in a spaced-apart relation at both sides of said output shaft while being crossed at a right angle with an extending direction of the output shaft and fixed to the end of an outermost casing of the oscillating actuator; a pair of sliding shafts having arms for holding a workpiece at their extreme ends and slidable along the guide rail blocks; and link mechanisms one end of which is fixed to the output shaft of said oscillating actuator and the other end of which is fixed to each of said sliding shafts to convert a swinging rotary movement of said output shaft into a linear reciprocating movement so as to transmit said rotary movement to each of the sliding shafts in which each of said output shaft and rotary shaft is projected at the other end of said oscillating actuator and an adjustable angle adjusting mechanism engaged with each of said output shaft and rotary shaft so as to regulate a swinging angle is provided.

* * * * *